(12) United States Patent
Takeyama et al.

(10) Patent No.: US 8,912,295 B2
(45) Date of Patent: *Dec. 16, 2014

(54) LONG CHAIN ALKYLENE GROUP-CONTAINING EPOXY COMPOUND

(75) Inventors: Toshiaki Takeyama, Funabashi (JP); Takeo Moro, Tokyo (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 148 days.

This patent is subject to a terminal disclaimer.

(21) Appl. No.: 13/148,823

(22) PCT Filed: Feb. 9, 2010

(86) PCT No.: PCT/JP2010/051865
§ 371 (c)(1),
(2), (4) Date: Aug. 10, 2011

(87) PCT Pub. No.: WO2010/092947
PCT Pub. Date: Aug. 19, 2010

(65) Prior Publication Data
US 2011/0319589 A1    Dec. 29, 2011

(30) Foreign Application Priority Data
Feb. 10, 2009    (JP) .................. 2009-028250

(51) Int. Cl.
C08G 73/06    (2006.01)
C08L 63/06    (2006.01)
C08G 59/32    (2006.01)
C07D 251/34    (2006.01)

(52) U.S. Cl.
CPC ............. *C08G 59/3236* (2013.01); *C08L 63/06* (2013.01)
USPC ........... 525/533; 525/423; 525/481; 525/524; 525/526; 528/367; 544/221

(58) Field of Classification Search
None
See application file for complete search history.

(56) References Cited

U.S. PATENT DOCUMENTS

| 4,369,207 A * | 1/1983 | Matsumura et al. ......... 427/501 |
| 4,376,120 A | 3/1983 | Zeidler et al. |
| 2007/0249760 A1 | 10/2007 | Gunji et al. |
| 2007/0295956 A1 | 12/2007 | Haitko |
| 2007/0295983 A1 | 12/2007 | Haitko |
| 2007/0299162 A1 | 12/2007 | Haitko |
| 2010/0009293 A1 * | 1/2010 | Yao et al. ..................... 430/312 |

FOREIGN PATENT DOCUMENTS

| JP | A-2001-181370 | 7/2001 |
| JP | A-2005-306952 | 11/2005 |
| JP | A-2008-7782 | 1/2008 |
| JP | A-2009-24185 | 2/2009 |
| WO | WO 2006/035641 A1 | 4/2006 |
| WO | WO 2009/008509 A1 | 1/2009 |

OTHER PUBLICATIONS

International Search Report mailed Apr. 20, 2010 issued in International Patent Application No. PCT/JP2010/051865.

* cited by examiner

*Primary Examiner* — Robert Sellers
(74) *Attorney, Agent, or Firm* — Oliff PLC

(57) ABSTRACT

It is an object to provide a liquid thermosetting composition that yields an epoxy resin having physical properties of the cured product such as high flexural strength along with adequate handleability as liquid, to be used in transparent sealants for optical semiconductors, such as transparent sealants for LEDs (light-emitting devices) and the like. There is provided a thermosetting composition containing an epoxy compound that a side chain between a triazinetrione ring and an epoxy group substituted on the triazinetrione ring is long (elongated).

11 Claims, No Drawings

LONG CHAIN ALKYLENE GROUP-CONTAINING EPOXY COMPOUND

TECHNICAL FIELD

The present invention relates to a liquid epoxy compound and a cured composition thereof.

BACKGROUND ART

Generally, crystalline epoxy resins have rigid or multifunctional main chain skeletons to show excellent heat resistance and are used in fields in which heat resistance reliability is required, such as the electrical and electronic fields.

However, the range of use of the crystalline epoxy resins is limited because cast molding processing, in which a liquid composition is employed, is required in some uses and the crystalline epoxy resins are used only in transfer molding or the like, in which solid material is employed.

However, the physical properties of conventional epoxy resins used in cast molding and similar liquid molding do not fully meet demands for the enhancement in the physical properties of cured products, including heat resistance that is increasingly demanded these days in adhesive, casting, sealing, molding, laminating, and similar fields. Hence, there is a growing demand for liquefaction of a crystalline multifunctional epoxy resin that imparts excellent heat resistance and similar physical properties of the cured product.

An epoxy resin is disclosed that is produced by lowering the crystallinity of a highly crystalline epoxy compound, such as tris-(2,3-epoxypropyl)-isocyanurate, through partial esterification of the epoxy groups to liquefy the epoxy compound (see Patent Document 1).

A compound including an epoxy ring bonded to a triazinetrione ring via a long chain alkylene group is disclosed (see Patent Document 2).

An epoxy compound including an epoxy ring bonded to a triazinetrione ring via a long chain alkylene group and an epoxy resin composition including the epoxy compound are disclosed (see Patent Documents 3, 4, and 5).

RELATED ART DOCUMENTS

Patent Documents

Patent Document 1: International Publication No. WO 2006/035641 pamphlet
Patent Document 2: U.S. Pat. No. 4,376,120 specification
Patent Document 3: U.S. Patent Application Publication No. 2007/0295956 specification
Patent Document 4: U.S. Patent Application Publication No. 2007/0295983 specification
Patent Document 5: U.S. Patent Application Publication No. 2007/0299162 specification

DISCLOSURE OF THE INVENTION

Problem to be Solved by the Invention

Liquid epoxy resins are used in potting, coating, casting, and the like by virtue of their characteristics such as having adequate handleability and causing few problems, including increased viscosity due to crystallization, on production. These days, however, particularly in the electrical and electronic fields in which enhanced integration of circuits, the use of lead-free solder, and the like are involved, advanced properties have been demanded on epoxy resin cured products to be used in sealants and the like, and therefore it becomes increasingly difficult for conventional liquid epoxy resins to satisfy these properties.

Hence, there is a growing demand for liquefaction of crystalline epoxy resins, such as multifunctional epoxy resins, that impart the cured products with excellent physical properties, including excellent heat resistance, in order to enhance the range of use of the epoxy resins.

It is an object of the present invention to provide a thermosetting composition that yields an epoxy resin having physical properties of the cured product such as high transparency and high flexural strength along with adequate handleability as liquid, to be used in transparent sealants for optical semiconductors, such as transparent sealants for LEDs (light-emitting devices) and the like.

Means for Solving the Problem

The present invention provides:
as a first aspect, a thermosetting composition including an epoxy compound of Formula (1):

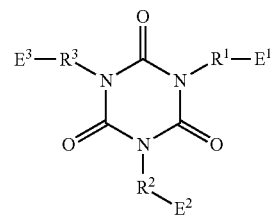

Formula (1)

[where $R^1$, $R^2$, and $R^3$ are independently a branched or linear $C_{1-6}$ alkylene group or oxyalkylene group, $E^1$, $E^2$, and $E^3$ are independently an epoxy-containing group of Formula (2):

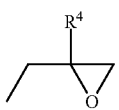

Formula (2)

an organic group of Formula (3):

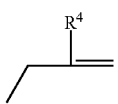

Formula (3)

(where $R^4$ is a hydrogen atom or a methyl group), or a hydrogen atom, and a proportion of the organic group of Formula (2) is 85 to 98 mol % to the total number of moles of $E^1$, $E^2$, and $E^3$];

as a second aspect, the thermosetting composition according to the first aspect, in which $R^1$, $R^2$, and $R^3$ are $C_{1-3}$ alkylene groups, $E^1$, $E^2$, and $E^3$ are combinations of the epoxy-containing group of Formula (2) and the organic group of Formula (3) or the hydrogen atom;

as a third aspect, a thermosetting composition including the epoxy compound (A) as described in the first aspect or the second aspect and an epoxy compound (B) containing at least two epoxy groups and having a structure different from a structure of the epoxy compound (A), with a mass ratio (A)/[(A)+(B)] of the epoxy compound (A) relative to the total mass of the epoxy compound (A) and the epoxy compound (B) of not smaller than 1% by mass;

as a fourth aspect, the thermosetting composition according to the third aspect, in which the epoxy compound (B) is a compound of Formula (4):

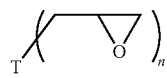

Formula (4)

or Formula (5):

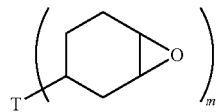

Formula (5)

(where n and m are integers of 2 to 5, T is a divalent to pentavalent organic group, and the organic group is a substituted or unsubstituted alkylene group, oxyalkylene group, arylene group, oxyarylene group, triazinetrione ring, or oxycarbonyl group);

as a fifth aspect, the thermosetting composition according to any one of the first aspect to the fourth aspect, in which a curing agent is contained in a proportion of 0.5 to 1.5 equivalents to the epoxy group;

as a sixth aspect, the thermosetting composition according to the fifth aspect, in which the curing agent is an acid anhydride or an amine; and as a seventh aspect, the thermosetting composition according to any one of the first aspect to the sixth aspect, in which a curing aid is contained in a proportion of 0.001 to 0.1 equivalents to the epoxy group.

Effects of the Invention

According to the present invention, a thermosetting composition (a liquid epoxy resin composition) can be provided from which an epoxy resin is obtained having physical properties of the cured product including high transparency and high flexural strength along with adequate handleability as liquid.

BEST MODES FOR CARRYING OUT THE INVENTION

Tris-(2,3-epoxypropyl)-isocyanurate, which is conventionally used, is an epoxy compound excellent in heat resistance, weather resistance, light resistance, transparency to visible light, and the like by virtue of the triazinetrione skeleton. Tris-(2,3-epoxypropyl)-isocyanurate yields a cured product the physical properties of which are affected by curing temperatures. A reason for this is assumed to be that tris-(2,3-epoxypropyl)-isocyanurate is a trifunctional epoxy compound having three carbon atoms per a side chain and having a rigid triazinetrione skeleton that is directly substituted with 2,3-epoxypropyl groups, and therefore thermal motion of the terminal epoxy groups during a curing reaction is limited and an unreacted epoxy group and an unreacted curing agent are likely to remain. It is presumed that, when two of the three epoxy groups crosslink with each other by a curing reaction, tris-(2,3-epoxypropyl)-isocyanurate is held inside the crosslinked structure in which crosslinking sites are shortly spaced from each other, and therefore thermal motion of the remaining, unreacted, third epoxy group is further limited to make a curing reaction thereof be less likely to occur. It is known that, when a curing temperature is raised, the curing reaction of an unreacted epoxy group proceeds to further increase crosslink density, thereby raising glass transition temperature significantly.

In the present invention, a side chain between a triazinetrione ring and an epoxy group substituted on the triazinetrione ring is long (elongated) and the number of intermolecular hydrogen bonds is small, resulting in triazine stacking failure. Hence liquefaction is achieved. The cured product of the epoxy compound has a certain glass transition temperature by virtue of the enhanced completeness of the curing reaction of the epoxy group, and therefore it has a certain crosslink density even in thermal environment to retain its strength and toughness. Moreover, because the curing reaction of the epoxy group completes in an early stage of curing, the cured product has a certain flexural strength and elasticity. Furthermore, water absorption caused by a hydroxy group resulting from the hydrolysis of an unreacted epoxy group and/or a carboxylic acid resulting from the hydrolysis of an acid anhydride (a curing agent) that does not undergo a reaction can be suppressed, and therefore a cured product low in a change in water absorption is obtained.

An epoxy resin obtained by thermosetting a compound in which an epoxy ring is bonded to a nitrogen atom of a triazinetrione ring via a long chain alkylene group has greater strength of the cured product when parts of the epoxy rings are epoxy precursors (allyl groups, for example) than when all of the three nitrogen atoms of the triazinetrione ring in the compound are bonded with epoxy rings via long chain alkylene groups. It is considered that the epoxy ring that is bonded via a long chain alkylene group has a great degree of freedom and high reactivity to allow all the epoxy groups to participate in a reaction to yield a cured product high in toughness. On the other hand, it is also considered that, when epoxy precursors (allyl groups, for example) exist at 2 to 15 mol% (85 to 98 mol% as epoxy purity) relative to the sum of the epoxy groups (glycidyl groups) and the epoxy precursors, three-dimensional crosslinking is suppressed to enhance strength and, at the same time, the allyl groups undergo a polymerization reaction, resulting in crosslinking to form a bond that is stronger than the crosslinking in ring formation by epoxy groups, thereby achieving further enhanced strength.

Specific aspects of the present invention will be described.

The present invention provides a thermosetting composition including a compound of Formula (1). The compound of Formula (1) itself or the compound of Formula (1) together with a curing agent can cause a curing reaction to form a cured product.

In Formula (1), $R^1$, $R^2$, and $R^3$ is independently a branched or linear $C_{1-6}$ alkylene group or oxyalkylene group.

Examples of the alkylene group include $C_{1-6}$ alkylene groups such as a methylene group, an ethylene group, an n-propylene group, an isopropylene group, a cyclopropylene group, an n-butylene group, an isobutylene group, a sec-butylene group, a tert-butylene group, a cyclobutylene group, a 1-methyl-cyclopropylene group, a 2-methyl-cyclopropylene group, an n-pentylene group, a 1-methyl-n-butylene group, a 2-methyl-n-butylene group, a 3-methyl-n-butylene group, a 1,1-dimethyl-n-propylene group, a 1,2-dimethyl-n-propylene group, a 2,2-dimethyl-n-propylene group, a 1-ethyl-n-propylene group, a cyclopentylene group, a 1-methyl-cyclobutylene group, a 2-methyl-cyclobutylene group, a 3-methyl-cyclobutylene group, a 1,2-dimethyl-cyclopropylene group, a 2,3-dimethyl-cyclopropylene group, a 1-ethyl-cyclopropylene group, a 2-ethyl-cyclopropylene group, an n-hexylene group, a 1-methyl-n-pentylene group, a 2-methyl-n-pentylene group, a 3-methyl-n-pentylene group, a 4-methyl-n-pentylene group, a 1,1-dimethyl-n-butylene group, a 1,2-dimethyl-n-butylene group, a 1,3-dimethyl-n-butylene group, a 2,2-dimethyl-n-butylene group, a 2,3-dimethyl-n-butylene group, a 3,3-dimethyl-n-butylene group, a 1-ethyl-n-butylene group, a 2-ethyl-n-butylene group, a 1,1,2-trimethyl-n-propylene group, a 1,2,2-trimethyl-n-propylene group, a 1-ethyl-1-methyl-n-propylene group, a 1-ethyl-2-methyl-n-propylene group, a cyclohexylene group, a 1-methyl-cyclopentylene group, a 2-methyl-cyclopentylene group, a 3-methyl-cyclopentylene group, a 1-ethyl-cyclobutylene group, a 2-ethyl-cyclobutylene group, a 3-ethyl-cyclobutylene group, a 1,2-dimethyl-cyclobutylene group, a 1,3-dimethyl-cyclobutylene group, a 2,2-dimethyl-cyclobutylene group, a 2,3-dimethyl-cyclobutylene group, a 2,4-dimethyl-cyclobutylene group, a 3,3-dimethyl-cyclobutylene group, a 1-n-propyl-cyclopropylene group, a 2-n-propyl-cyclopropylene group, a 1-isopropyl-cyclopropylene group, a 2-isopropyl-cyclopropylene group, a 1,2,2-trimethyl-cyclopropylene group, a 1,2,3-trimethyl-cyclopropylene group, a 2,2,3-trimethyl-cyclopropylene group, a 1-ethyl-2-methyl-cyclopropylene group, a 2-ethyl-1-methyl-cyclopropylene group, a 2-ethyl-2-methyl-cyclopropylene group, a 2-ethyl-3-methyl-cyclopropylene group, and the like. $C_{1-3}$ alkylene groups are particularly preferable.

Examples of the oxyalkylene group include $C_{1-6}$ oxyalkylene groups such as an oxymethylene group, an oxyethylene group, an oxy-n-propylene group, an oxyisopropylene group, an oxycyclopropylene group, an oxy-n-butylene group, an oxyisobutylene group, an oxy-sec-butylene group, an oxy-tert-butylene group, an oxycyclobutylene group, an oxy-1-methyl-cyclopropylene group, an oxy-2-methyl-cyclopropylene group, an oxy-n-pentylene group, an oxy-1-methyl-n-butylene group, an oxy-2-methyl-n-butylene group, an oxy-3-methyl-n-butylene group, an oxy-1,1-dimethyl-n-propylene group, an oxy-1,2-dimethyl-n-propylene group, an oxy-2,2-dimethyl-n-propylene group, an oxy-1-ethyl-n-propylene group, an oxycyclopentylene group, an oxy-1-methyl-cyclobutylene group, an oxy-2-methyl-cyclobutylene group, an oxy-3-methyl-cyclobutylene group, an oxy-1,2-dimethyl-cyclopropylene group, an oxy-2,3-dimethyl-cyclopropylene group, an oxy-1-ethyl-cyclopropylene group, an oxy-2-ethyl-cyclopropylene group, an oxy-n-hexylene group, an oxy-1-methyl-n-pentylene group, an oxy-2-methyl-n-pentylene group, an oxy-3-methyl-n-pentylene group, an oxy-4-methyl-n-pentylene group, an oxy-1,1-dimethyl-n-butylene group, an oxy-1,2-dimethyl-n-butylene group, an oxy-1,3-dimethyl-n-butylene group, an oxy-2,2-dimethyl-n-butylene group, an oxy-2,3-dimethyl-n-butylene group, an oxy-3,3-dimethyl-n-butylene group, an oxy-1-ethyl-n-butylene group, an oxy-2-ethyl-n-butylene group, an oxy-1,1,2-trimethyl-n-propylene group, an oxy-1,2,2-trimethyl-n-propylene group, an oxy-1-ethyl-1-methyl-n-propylene group, an oxy-1-ethyl-2-methyl-n-propylene group, an oxycyclohexylene group, an oxy-1-methyl-cyclopentylene group, an oxy-2-methyl-cyclopentylene group, an oxy-3-methyl-cyclopentylene group, an oxy-1-ethyl-cyclobutylene group, an oxy-2-ethyl-cyclobutylene group, an oxy-3-ethyl-cyclobutylene group, an oxy-1,2-dimethyl-cyclobutylene group, an oxy-1,3-dimethyl-cyclobutylene group, an oxy-2,2-dimethyl-cyclobutylene group, an oxy-2,3-dimethyl-cyclobutylene group, an oxy-2,4-dimethyl-cyclobutylene group, an oxy-3,3-dimethyl-cyclobutylene group, an oxy-1-n-propyl-cyclopropylene group, an oxy-2-n-propyl-cyclopropylene group, an oxy-1-isopropyl-cyclopropylene group, an oxy-2-isopropyl-cyclopropylene group, an oxy-1,2,2-trimethyl-cyclopropylene group, an oxy-1,2,3-trimethyl-cyclopropylene group, an oxy-2,2,3-trimethyl-cyclopropylene group, an oxy-1-ethyl-2-methyl-cyclopropylene group, an oxy-2-ethyl-1-methyl-cyclopropylene group, an oxy-2-ethyl-2-methyl-cyclopropylene group, an oxy-2-ethyl-3-methyl-cyclopropylene group, and the like. In particular, oxyethylene groups and oxyisopropylene groups are preferably used.

$E^1$, $E^2$, and $E^3$ in Formula (1) is independently an epoxy-containing group of Formula (2), an organic group of Formula (3), or a hydrogen atom. The proportion of organic group of Formula (2) to the total number of moles of $E^1$, $E^2$, and $E^3$ is 85 to 98 mol % and is preferably 85 to 95 mol %. In Formula (2) and Formula (3), $R^4$s each is a hydrogen atom or a methyl group.

In Formula (1), $R^1$, $R^2$, and $R^3$ are preferably $C_{1-3}$ alkylene groups, and $E^1$, $E^2$, and $E^3$ are preferably combinations of the epoxy-containing group of Formula (2) and the organic group of Formula (3) or a hydrogen atom.

For example, the compounds of Formula (1-1) to Formula (1-21) are preferable.

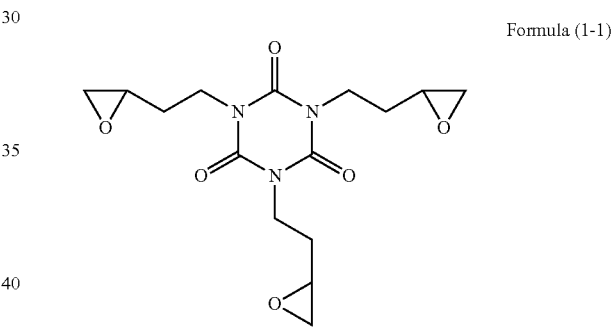

Formula (1-1)

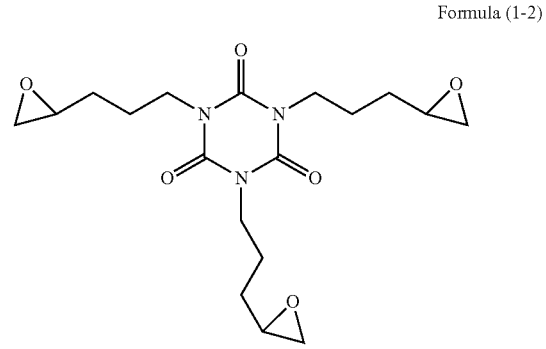

Formula (1-2)

-continued
Formula (1-3)
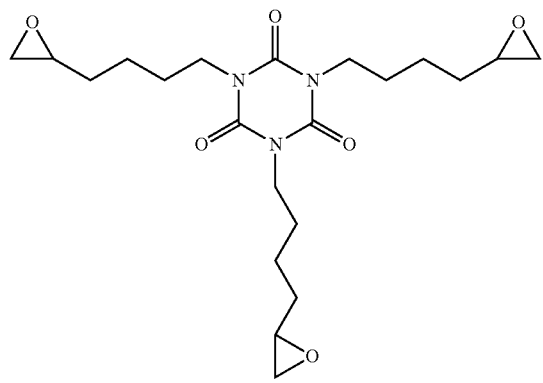
Formula (1-4)
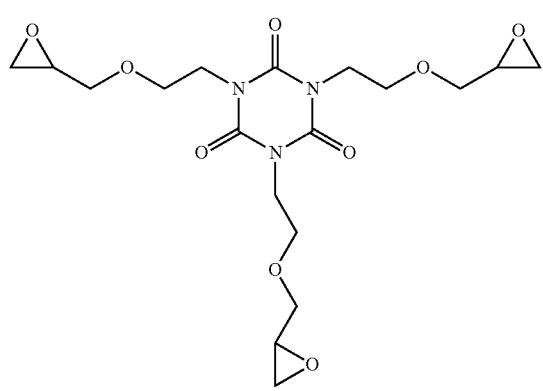
Formula (1-5)
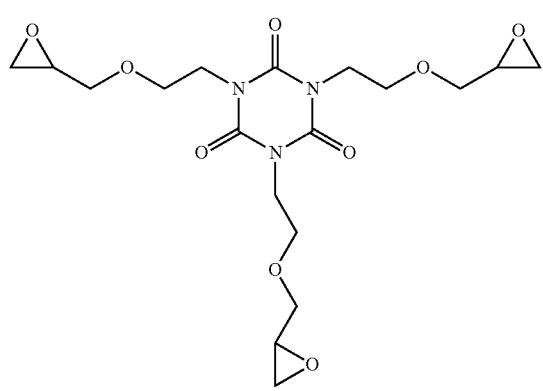
Formula (1-6)
Formula (1-7)
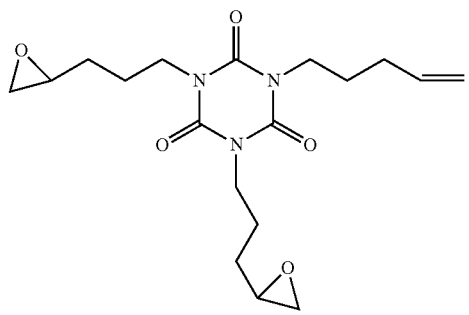
Formula (1-8)
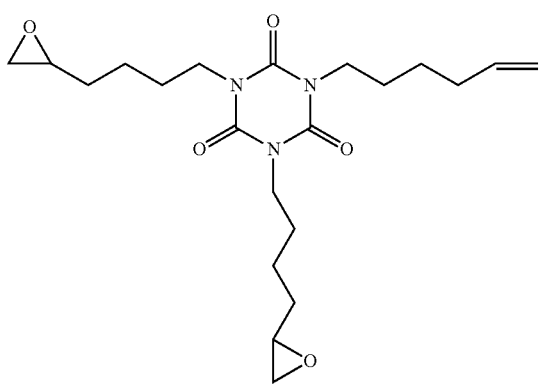
Formula (1-9)
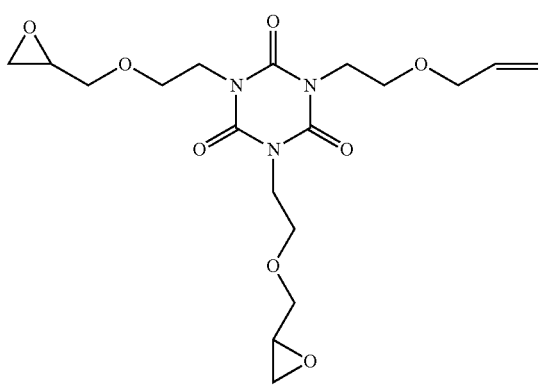
Formula (1-10)
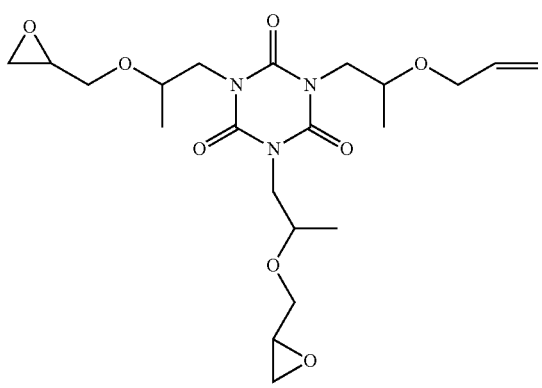

Formula (1-11)
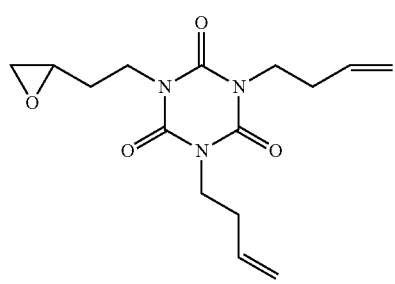
Formula (1-12)
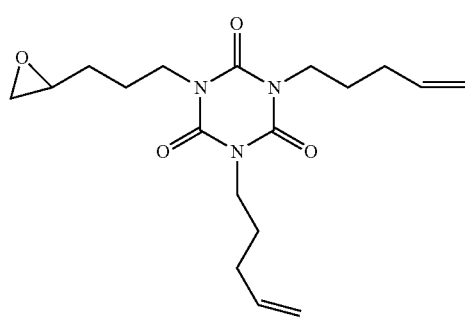
Formula (1-13)
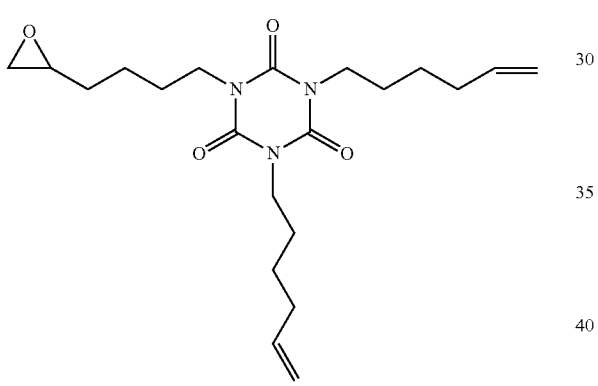
Formula (1-14)
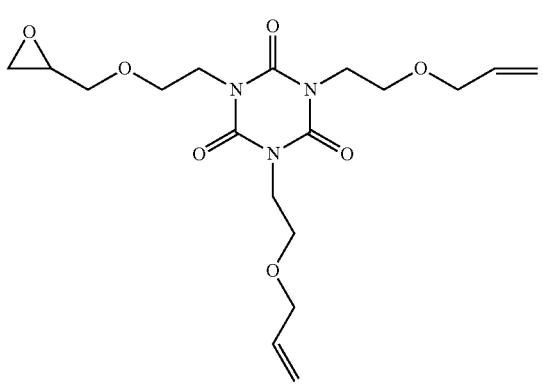
Formula (1-15)
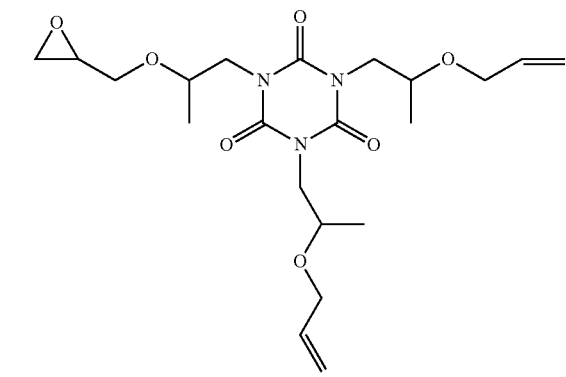
Formula (1-16)
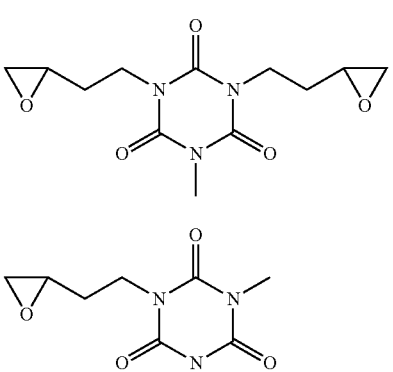
Formula (1-17)
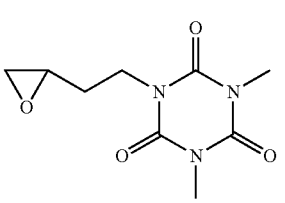
Formula (1-18)
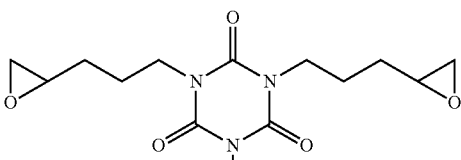
Formula (1-19)
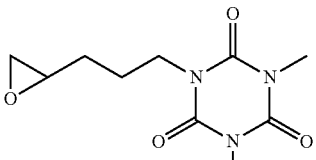
Formula (1-20)
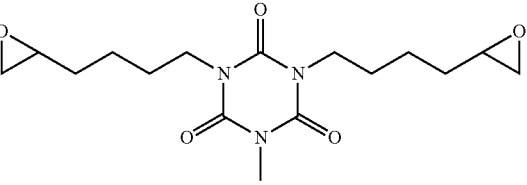
Formula (1-21)
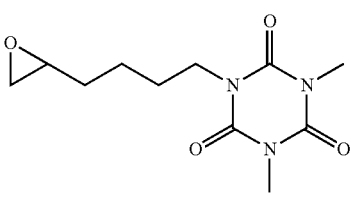

An epoxy compound of Formula (1) to be used in the present invention can be obtained, for example, by the process below in the case of the compound of Formula (1-2).

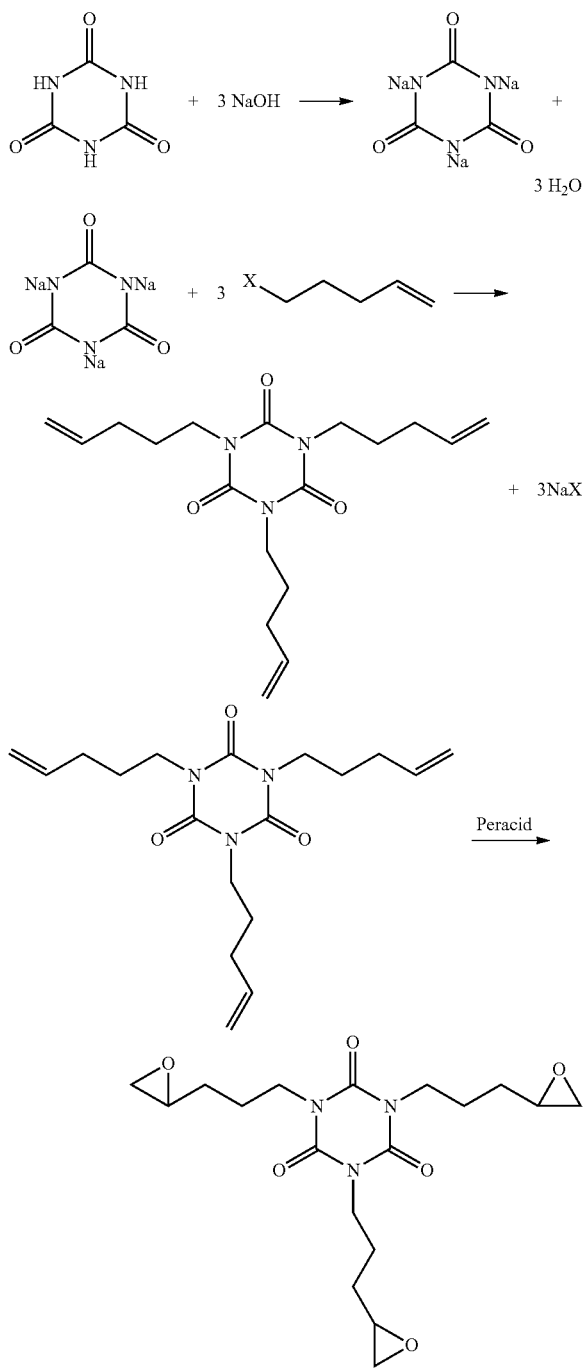

In the above reaction, isocyanuric acid is converted to an isocyanuric acid Na salt using sodium hydroxide. This reaction can be carried out in water at 0 to 100° C. for 1 to 10 hours. Furthermore, the isocyanuric acid Na salt and a halogenated alkene undergo a reaction to yield an alkene-substituted isocyanuric acid. This reaction can be carried out, for example, in a DMF (dimethylformamide) solvent at 0 to 150° C. for 1 to 10 hours. In the Formula, X is a halogen atom, and a monobromoalkene or a monochloroalkene can be used as the halogenated alkene. The alkene-substituted isocyanuric acid can be oxidized with a peracid to yield an epoxy compound. M-chloroperoxybenzoic acid, peracetic acid, hydrogen peroxide-tungstate, or the like can be used as the peracid. This reaction can be carried out in a solvent such as methylene chloride and toluene at 0 to 110° C. for 1 to 10 hours. The compounds of Formula (1-1), Formula (1-3), Formula (1-6) to Formula (1-8), and Formula (1-11) to Formula (1-13) can also be synthesized by the same process.

An epoxy compound of Formula (1) to be used in the present invention can be obtained, for example, by the process below in the case of the compound of Formula (1-4).

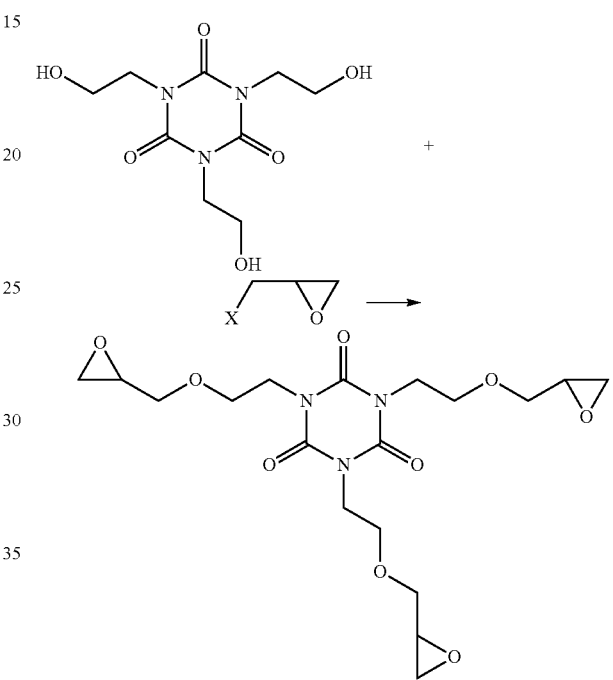

In the above reaction, a hydroxyalkyl isocyanurate and epihalohydrin undergo a reaction to yield tris(alkyleneoxyglycidyl)isocyanurate. Examples of the hydroxyalkyl isocyanurate include hydroxyethyl isocyanurate and the like, and examples of the epihalohydrin include epichlorohydrin, epibromohydrin, and the like. The reaction is carried out in a solvent such as dioxane using $BF_3$ or tin chloride as a catalyst at 0 to 100° C. for 1 to 10 hours. The compounds of Formula (1-5), Formula (1-9), Formula (1-10), Formula (1-14), and Formula (1-15) can also be synthesized by the same process.

Methyl- and alkenyl-substituted isocyanuric acids as precursors of the compounds of Formula (1-16) to Formula (1-21) are obtained as mixtures with trialkenyl-substituted isocyanuric acids by the reaction of isocyanuric acid with a halogenated alkene.

This reaction can be carried out, for example, in the presence of potassium carbonate in N,N-dimethylimidazolidinone at 0 to 150° C. for 1 to 20 hours.

Besides, potassium hydrogen carbonate, sodium carbonate, and sodium hydrogen carbonate can be used as an inorganic base. It is assumed that, in this reaction, some of the methyl groups of N,N-dimethylimidazolidinone used as a solvent react with isocyanuric acid.

It is assumed that, in this reaction, some of the methyl groups of N,N-dimethylimidazolidinone used as a solvent react with isocyanuric acid.

Then, the methyl- or alkenyl-substituted isocyanuric acid can be oxidized with a peracid to yield an epoxy compound. M-chloroperoxybenzoic acid, peracetic acid, hydrogen peroxide-tungstate, or the like can be used as the peracid. This reaction can be carried out in a solvent such as methylene chloride and toluene at 0 to 110° C. for 1 to 20 hours.

The present invention provides a thermosetting composition including an epoxy compound (A) of Formula (1) and an epoxy compound (B) having at least two epoxy groups and a structure different from that of the epoxy compound (A), with a mass ratio (A)/[(A)+(B)] of the epoxy compound (A) relative to the total mass of the epoxy compound (A) and the epoxy compound (B) of not smaller than 1% by mass and preferably of not smaller than 1.5% by mass. This mass ratio (A)/[(A)+(B)] can be 100% by mass, in other words, the epoxy compound (A) can be used alone. When an epoxy compound obtained by mixing the epoxy compound (A) with the epoxy compound (B) is used in consideration of manufacturing cost, the ratio can be in the range of up to 50% by mass.

The epoxy compound (B) is an epoxy compound of Formula (4) or Formula (5), and is a compound that has two to five epoxy groups in a molecule. In Formula (4) or Formula (5), n and m are integers of 2 to 5, T is a divalent to pentavalent organic group, and the organic group is a substituted or unsubstituted alkylene group, oxyalkylene group, arylene group, oxyarylene group, triazinetrione ring, oxycarbonyl group, or a combination of these. Examples of the epoxy compounds of Formula (4) and Formula (5) will be shown below.

A liquid epoxy compound (Formula (4-1), manufactured by Nissan Chemical Industries, Ltd., trade name: TEPIC-PAS B22) obtained by modifying 1 mol of tris-(2,3-epoxypropyl)-isocyanurate by adding 0.8 mol of propionic anhydride thereto Formula (4-1)

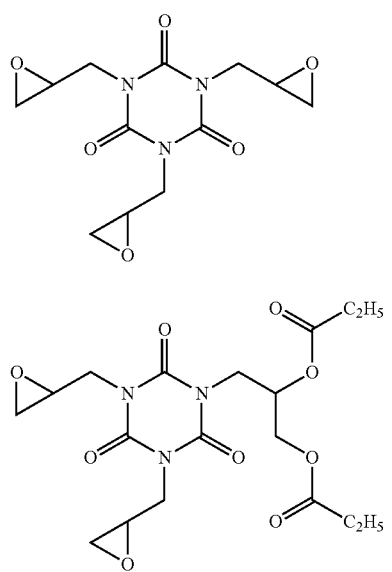

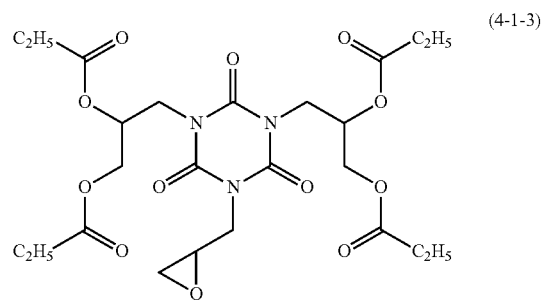

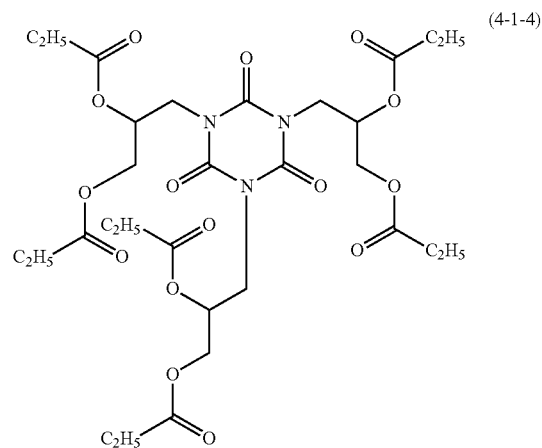

Formula (4-1) expresses a mixture containing the compound of Formula (4-1-1), the compound of Formula (4-1-2), the compound of Formula (4-1-3), and the compound of Formula (4-1-4) in a molar ratio (4-1-1):(4-1-2):(4-1-3):(4-1-4) of about 35%:45%:17%:3%. The viscosity on production at 60° C. is 1800 mPas and the viscosity after 90 days at 60° C. is 1900 mPas, which means the mixture is stable.

A liquid epoxy compound (Formula (4-2), manufactured by Nissan Chemical Industries, Ltd., trade name TEPIC-PAS B26) obtained by modifying 1 mol of tris-(2,3-epoxypropyl)-isocyanurate by adding 0.4 mol of propionic anhydride thereto Formula (4-2)

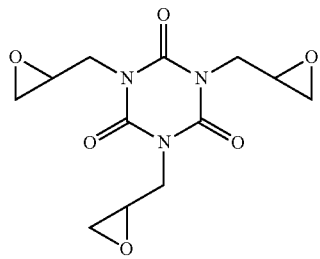

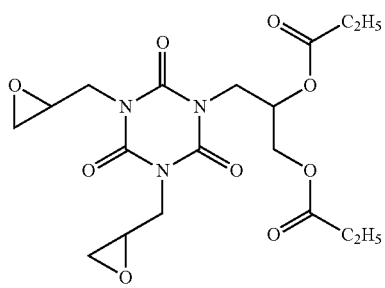

(4-2-2)

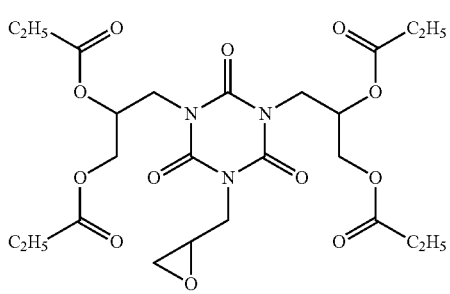

(4-2-3)

Formula (4-2) expresses a mixture including the compound of Formula (4-2-1), the compound of Formula (4-2-2), and the compound of Formula (4-2-3) in a molar ratio (4-2-1):(4-2-2):(4-2-3) of about 60%:about 32%:about 8%. The viscosity on production at 60° C. is 2800 mPas and the viscosity after 90 days at 60° C. is 3000 mPas, which means the mixture is stable.

A solid epoxy compound, tris-(2,3-epoxypropyl)-isocyanurate (Formula (4-3), trade name TEPIC, manufactured by Nissan Chemical Industries, Ltd.)

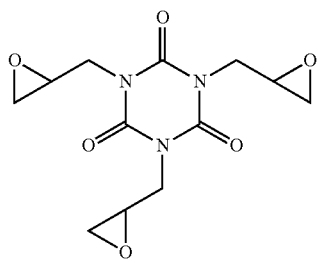

Formula (4-3)

A liquid epoxy compound, trade name Epicoat 828 (Formula (4-4), manufactured by Japan Epoxy Resin Co., Ltd.)

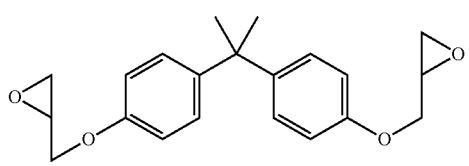

Formula (4-4)

A liquid epoxy compound, trade name YX8000 (Formula (4-5), manufactured by Japan Epoxy Resin Co., Ltd.)

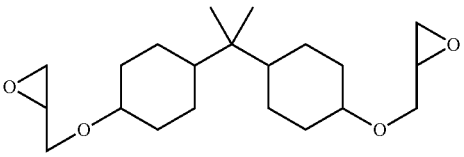

Formula (4-5)

A liquid epoxy compound, trade name DME100 (Formula (4-6), manufactured by New Japan Chemical Co., Ltd.)

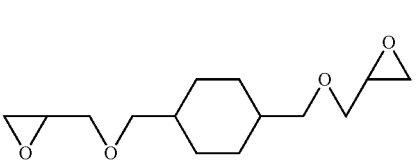

Formula (4-6)

A liquid epoxy compound, trade name CE-2021P (Formula (5-1), manufactured by DAICEL Co., LTD.)

Formula (5-1)

In the present invention, a curing agent can be incorporated in a proportion of 0.5 to 1.5 equivalents and preferably 0.8 to 1.2 equivalents to the epoxy group of the epoxy compound. The equivalent value of the curing agent relative to that of the epoxy compound is shown as the equivalent ratio of a curing group in the curing agent relative to the epoxy group.

Examples of the curing agent include phenol resins, amines, polyamide resins, imidazoles, polymercaptans, acid anhydrides, and the like. Acid anhydrides and amines are particularly preferable.

When the curing agents are solid, they can be used by dissolving them in solvent, however, a decrease in density of the cured product caused by the evaporation of the solvent and decreases in strength and in water resistance caused by the formation of pores occur. Therefore, the curing agent is preferably liquid at normal temperature and under normal pressure.

Examples of the phenol resin include phenol novolac resins, cresol novolac resins, and the like.

Examples of the amine include piperidine, N,N-dimethylpiperazine, triethylenediamine, 2,4,6-tris(dimethylaminomethyl)phenol, benzyldimethylamine, 2-(dimethylaminomethyl)phenol, diethylenetriamine, triethylenetetramine, tetraethylenepentamine, diethylaminopropylamine, N-aminoethyl piperazine, di(1-methyl-2-aminocyclohexyl)methane, menthenediamine, isophoronediamine, diaminodicyclohexylmethane, 1,3-diaminomethylcyclohexane, xylenediamine, m-phenylenediaimine, diaminodiphenylmethane, diaminodiphenylsulfone, and the like. Among these, diethylenetriamine, triethylenetetramine, tetraethylenepentamine, diethylaminopropylamine, N-aminoethyl piperazine, di(1-methyl-2-aminocyclohexyl)methane, menthenediamine, isophoronediamine, diaminodicyclohexylmethane, and the like, which are liquid, can be preferably used.

Examples of the polyamide resin include polyamidoamines having a primary amine and a secondary amine in a molecule and resulting from the condensation of a dimer acid and a polyamine.

Examples of the imidazole include 2-methylimidazole, 2-ethyl-4-methylimidazole, 1-cyanoethyl-2-undecylimidazolium trimellitate, epoxy imidazole adducts, and the like.

The polymercaptan has, for example, a polypropylene glycol chain containing a terminal mercaptan group or a polyethylene glycol chain containing a terminal mercaptan group, and is preferably liquid.

The acid anhydride is preferably an anhydride of a compound having a plurality of carboxy groups in a molecule. Examples of the acid anhydride include phthalic anhydride, trimellitic anhydride, pyromellitic anhydride, benzophenonetetracarboxylic anhydride, ethylene glycol bistrimellitate, glycerol tristrimellitate, maleic anhydride, tetrahydrophthalic anhydride, methyltetrahydrophthalic anhydride, endomethylene tetrahydrophthalic anhydride, methyl endomethylene tetrahydrophthalic anhydride, methylbutenyltetrahydrophthalic anhydride, dodecenyl succinic anhydride, hexahydrophthalic anhydride, methylhexahydrophthalic anhydride, succinic anhydride, methylcyclohexenedicarboxylic anhydride, chlorendic anhydride, and the like.

Among these, methyltetrahydrophthalic anhydride, methyl-5-norbornene-2,3-dicarboxylic anhydride (methylnadic anhydride, methylhimic anhydride), hydrogenated methylnadic anhydride, methylbutenyltetrahydrophthalic anhydride, dodecenyl succinic anhydride, methylhexahydrophthalic anhydride, and a mixture of methylhexahydrophthalic anhydride and hexahydrophthalic anhydride, which are liquid at normal temperature and under normal pressure, are preferable. The viscosities of these liquid acid anhydrides are about 10 mPas to 1000 mPas as measured at 25° C.

A curing aid may be concurrently used, as needed, to obtain the cured product. Examples of the curing aid include organophosphorus compounds such as triphenylphosphine and tributylphosphine, quaternary phosphonium salts such as ethyltriphenylphosphonium bromide and diethyl methyltriphenylphosphoniumphosphate, 1,8-diazabicyclo(5,4,0)undecan-7-ene, a salt of 1,8-diazabicyclo(5,4,0)undecan-7-ene and octylic acid, zinc octoate, and quaternary ammonium salts such as tetrabutylammonium bromide. The curing aid can be incorporated in a proportion of 0.001 to 0.1 parts by mass to 1 part by mass of the curing agent.

In the present invention, the epoxy compound of Formula (1), the curing agent and, when needed, the curing aid are mixed to obtain a thermosetting composition. The epoxy compound (A), the epoxy compound (B) having at least two epoxy groups and having a structure different from that of the epoxy compound (A), the curing agent and, when needed, the curing aid are mixed to obtain a thermosetting composition. The mixing can be performed using a reaction flask and a stirring blade.

The mixing is performed by heat mixing and is performed at a temperature of 60° C. to 100° C. for 0.5 to 1 hours.

The obtained liquid epoxy resin composition (thermosetting composition) has viscosity suitable for use as a liquid sealant. The liquid thermosetting composition can be prepared to have any viscosity, and coating thereof can be performed by a casting method, a potting method, a dispensing method, a printing method, or the like. Thus, when used as a transparent sealant for LEDs or the like, the composition can partly seal any desired area on the LEDs or the like. The liquid thermosetting composition is coated to a base material such as LEDs directly as liquid by the above method, is then dried, and is heated at a temperature of 100 to 200° C., and therefore a cured resin article is obtained.

EXAMPLES

The materials below were prepared.

Epoxy Compound (1)

Synthesis of tris-(4,5-epoxypentyl)-isocyanurate with epoxy purity of 98%

Into slurry obtained by placing 106 g of isocyanuric acid and 420 ml of water in a reactor, 206 g of a 48% sodium hydroxide solution was dropped, and a reaction was allowed to proceed at a temperature of 60 to 70° C. for 2 hours, followed by distilling off the water, washing with methanol, and drying to obtain 157.5 g of sodium isocyanurate as white crystals. 400 ml of dimethylformamide as a solvent was placed in a reactor equipped with a stirrer and a condenser and was subjected to a reaction with 157.5 g of sodium isocyanurate and 361.4 g of 5-bromo-1-pentene at 120 to 125° C. for 6 hours, followed by filtering off an inorganic salt, extracting with toluene, washing with water, drying, and distilling off the solvent to obtain 205 g of tris 5-pentenyl isocyanurate as a light brown oil. 8700 ml of methylene chloride as a solvent was placed in a reactor equipped with a stirrer and a condenser, 205 g of tris 5-pentenyl isocyanurate was added thereto, and 815 g of m-chloroperoxybenzoic acid was slowly added thereto at not higher than 30° C., followed by a reaction at 25° C. for 4 hours. After the completion of the reaction, 3000 ml of a 10% aqueous solution of sodium hydrogen sulfite was slowly added at not higher than 20° C., and insoluble matter was filtered off, followed by adding chloroform to perform solvent extraction. The product was thoroughly washed with a 10% aqueous solution of sodium hydrogen sulfite and a solution of saturated sodium hydrogen carbonate, then dried, and the solvent was distilled off to obtain a crude product. The crude product can be purified by silica gel chromatography to obtain 161.7 g of a transparent oil. The obtained epoxy compound was tris(4,5-epoxypentyl) isocyanurate of Formula (1-2). Potentiometric titration for epoxy value was performed using a 0.1 mol/L perchloric acid/acetic acid solution, and the epoxy purity measured by potentiometric titration was 98%, and the epoxy compound was a mixture of the compounds of Formula (1-2), Formula (1-7), and Formula (1-12). The epoxy compound was called (i-1).

(2)

Synthesis of tris-(4,5-epoxypentyl)-isocyanurate with epoxy purity of 99%

Synthesis was performed in the same manner as in the case of (1) except that tris 5-pentenyl isocyanurate as a transparent oil obtained by silica gel chromatography purification was used as a raw material. The obtained epoxy compound was tris(4,5-epoxypentyl)isocyanurate of Formula (1-2). The epoxy purity measured by potentiometric titration was 99%, and the epoxy compound was a mixture of the compounds of Formula (1-2), Formula (1-7), and Formula (1-12). The epoxy compound was called (i-2).

(3)

Synthesis of tris-(4,5-epoxypentyl)-isocyanurate with epoxy purity of 90%

Synthesis was performed in the same manner as in the case of (1) except that the reaction proportion was 24.5 g of tris 5-pentenyl isocyanurate to 49.3 g of m-chloroperoxybenzoic acid. The obtained epoxy compound was tris(4,5-epoxypentyl)isocyanurate of Formula (1-2). The epoxy purity measured by potentiometric titration was 90%, and the epoxy compound was a mixture of the compounds of Formula (1-2), Formula (1-7), and Formula (1-12). The epoxy compound was called (i-3).

(4)

Synthesis of tris-(4,5-epoxypentyl)-isocyanurate with epoxy purity of 82 mol %

Synthesis was performed in the same manner as in the case of (1) except that the reaction proportion was 25.1 g of tris 5-pentenyl isocyanurate to 45.0 g of m-chloroperoxybenzoic acid. The obtained epoxy compound was tris(4,5-epoxypentyl)isocyanurate of Formula (1-2). The epoxy purity measured by potentiometric titration was 82%, and the epoxy compound was a mixture of the compounds Formula (1-2), Formula (1-7), and Formula (1-12). The epoxy compound was called (i-4).

(5)

Tris-(2,3-epoxypropyl)-isocyanurate (manufactured by Nissan Chemical Industries, Ltd., trade name TEPIC) of Formula (4-3) was prepared. It was called an epoxy compound (i-5).

(6)

A liquid epoxy (trade name TEPIC-PAS B22, manufactured by Nissan Chemical Industries, Ltd.) was prepared.

The synthesis process will be described below. 894.7 g of α-form tris-(2,3-epoxypropyl)-isocyanurate (manufactured by Nissan Chemical Industries, Ltd., with an epoxy value of 9.95 eq/kg) and 400 g of toluene were placed in a reaction flask equipped with a condenser tube, a thermometer, and a stirring device, followed by heating to the reflux temperature so as to completely dissolve them. 313.3 g of a propionic anhydride solution in which 0.38 g of triphenylphosphonium bromide as a reaction catalyst was dissolved was then dropped into the reaction system over 60 minutes. After the completion of the dropping, a reaction was allowed to proceed at the reflux temperature for 2 hours. The reaction fluid was concentrated, and toluene was distilled off after the epoxy value was confirmed to be not higher than 5.65 eq/kg (the theoretical value is 5.48 eq/kg) to obtain 1208 g of a modified liquid epoxy resin.

The composition of the obtained modified liquid epoxy resin was as shown in Formula (4-1). Referring tris-(2,3-epoxypropyl)-isocyanurate as a compound (4-1-1), tris-(2,3-epoxypropyl)-isocyanurate (monoadduct) in which one molecule of propionic anhydride is added to one epoxy group of tris-(2,3-epoxypropyl)-isocyanurate as a compound (4-1-2), tris-(2,3-epoxypropyl)-isocyanurate (diadduct) in which two molecules of propionic anhydride are added to two epoxy groups of tris-(2,3-epoxypropyl)-isocyanurate as a compound (4-1-3), and tris-(2,3-epoxypropyl)-isocyanurate (triadduct) in which three molecules of propionic anhydride are added to three epoxy groups of tris-(2,3-epoxypropyl)-isocyanurate as a compound (4-1-4), the molar ratio (4-1-1):(4-1-2):(4-1-3):(4-1-4) of the compound (4-1-1) to the compound (4-1-4) in the modified epoxy resin was 35%:45%:17%:3%.

The viscosity of the modified epoxy resin on production at 60° C. was 1800 mPas and the viscosity after 90 days at 60° C. was 1900 mPas, which means the modified epoxy resin was stable. The epoxy compound was called (i-6).

(7)

A liquid epoxy (trade name TEPIC-PAS B26, manufactured by Nissan Chemical Industries, Ltd.) was prepared.

The synthesis process will be described below. 594.6 g of α-form tris-(2,3-epoxypropyl)-isocyanurate (manufactured by Nissan Chemical Industries, Ltd., with an epoxy value of 9.95 eq/kg) and 80 g of acetonitrile were placed in a reaction flask equipped with a condenser tube, a thermometer, and a stirring device, followed by heating to the reflux temperature so as to completely dissolve them. 108 g of a propionic anhydride solution in which 0.28 g of triphenylphosphonium bromide as a reaction catalyst was dissolved was then dropped into the reaction system over 60 minutes. After the completion of the dropping, a reaction was allowed to proceed at the reflux temperature for 2 hours. The reaction fluid was concentrated, and toluene was distilled off after the epoxy value was confirmed to be not higher than 7.5 eq/kg (the theoretical value is 7.36 eq/kg) to obtain 702 g of a modified liquid epoxy resin.

The composition of the obtained modified liquid epoxy resin was as shown in Formula (4-2). Referring tris-(2,3-epoxypropyl)-isocyanurate as a compound (4-2-1), tris-(2,3-epoxypropyl)-isocyanurate (monoadduct) in which one molecule of propionic anhydride is added to one epoxy group of tris-(2,3-epoxypropyl)-isocyanurate as a compound (4-2-2), and tris-(2,3-epoxypropyl)-isocyanurate (diadduct) in which two molecules of propionic anhydride are added to two epoxy groups of tris-(2,3-epoxypropyl)-isocyanurate as a compound (4-2-3), the molar ratio (4-2-1):(4-2-2):(4-2-3) of the compound (4-2-1) to the compound (4-2-3) in the modified epoxy resin was 60%:32%:8%.

The viscosity of the modified epoxy resin on production at 60° C. was 2800 mPas and the viscosity after 90 days at 60° C. was 3000 mPas, which means the modified epoxy resin was stable. The modified epoxy resin was called an epoxy compound (i-7).

(8)

A liquid epoxy compound, trade name CE-2021P (manufactured by DAICEL Co., LTD.) of Formula (4-7) was obtained. It was called an epoxy compound (i-8).

(9)

Synthesis of tris-(4,5-epoxypentyl)-isocyanurate with epoxy purity of 95%

109.4 g of isocyanuric acid, 351.5 g of potassium carbonate, and 1083.0 g of N,N-dimethylimidazolidinone were placed in a reactor, 361.0 g of 5-bromo-1-pentene was slowly added thereto at 110° C., and a reaction was allowed to proceed for additional 14 hours. After the reaction, the product was cooled, filtrated, extracted with heptane, concentrated, and then 6000 mL of methylene chloride and 659 g of m-chlorobenzoic acid were slowly added thereto at not higher than 30° C. to allow a reaction to proceed at 25° C. for 4 hours. After the completion of the reaction, 3000 ml of a 10% aqueous solution of sodium hydrogen sulfite was slowly added thereto at not higher than 20° C., and insoluble matter was filtered off, followed by adding chloroform to perform solvent extraction. The product was thoroughly washed with a 10% aqueous solution of sodium hydrogen sulfite and a solution of saturated sodium hydrogen carbonate, then dried, and the solvent was distilled off to obtain a crude product. The crude product can be purified by silica gel chromatography to obtain 161.7 g of a transparent oil. The obtained epoxy compound was tris(4,5-epoxypentyl)isocyanurate of Formula (1-2). Potentiometric titration for epoxy value was performed using a 0.1 mol/L perchloric acid/acetic acid solution, and the epoxy purity measured by potentiometric titration was 95%, and the epoxy compound was a mixture of the compounds of Formula (1-2), Formula (1-18), and Formula (1-19). The epoxy compound was called (i-9).

(Curing Agent)

(1) A mixture (trade name RIKACID MH-700, manufactured by New Japan Chemical Co., Ltd.) of 4-methylhexahydrophthalic anhydride (70 mol %) and hexahydrophthalic anhydride (30 mol %) was prepared. It was called a curing agent (ii-1).

(Curing Accelerator)

(1) Tetrabutylphosphonium O,O'-diethylphosphodithiolate (trade name HISHICOLIN PX-4ET, manufactured by Nippon Chemical Industrial Co., Ltd.) was prepared. It was called a curing accelerator (iii-1).

Example 1

22.0 g of the epoxy compound (i-1) and 27.85 g of the curing agent (ii-1) were placed in a four-necked flask, and defoaming was performed at 80° C. for 30 minutes with stirring, followed by adding 0.23 g of the curing accelerator (iii-1) thereto to obtain a thermosetting composition. The obtained thermosetting composition was heated at 100° C. for 2 hours and was then heated at 150° C. for 5 hours to obtain a cured product.

Example 2

25.0 g of the epoxy compound (i-3) and 28.8 g of the curing agent (ii-1) were placed in a four-necked flask, and defoaming was performed at 80° C. for 30 minutes with stirring, followed by adding 0.26 g of the curing accelerator (iii-1) thereto to obtain a thermosetting composition. The obtained thermosetting composition was heated at 100° C. for 2 hours and was then heated at 150° C. for 5 hours to obtain a cured product.

Example 3

0.44 g of the epoxy compound (i-3), 27.1 g of the epoxy compound (i-6), and 25.4 g of the curing agent (ii-1) were placed in a four-necked flask, and defoaming was performed at 80° C. for 30 minutes with stirring, followed by adding 0.275 g of the curing accelerator (iii-1) thereto to obtain a thermosetting composition. The obtained thermosetting composition was heated at 100° C. for 2 hours and was then heated at 150° C. for 5 hours to obtain a cured product.

Example 4 to Example 7

Curing was performed in the same manner as in the case of Example 3 by matching an epoxy value with the equivalent of a curing agent except that the proportion of the epoxy compound (i-3) to the epoxy compound (i-6) was changed to 0.86 g:28.1 g in Example 4, 1.43 g:27.2 g in Example 5, 2.57 g:26.0 g in Example 6, and 4.44 g:25.3 g in Example 7.

Example 8

0.37 g of the epoxy compound (i-3), 24.3 g of the epoxy compound (i-8), and 31.25 g of the curing agent (ii-1) were placed in a four-necked flask, and defoaming was performed at 80° C. for 30 minutes with stirring, followed by adding 0.245 g of the curing accelerator (iii-1) thereto to obtain a thermosetting composition. The obtained thermosetting composition was heated at 100° C. for 2 hours and was then heated at 150° C. for 5 hours to obtain a cured product.

Example 9 to Example 12

Curing was performed in the same manner as in the case of Example 8 by matching an epoxy value with the equivalent of a curing agent except that the proportion of the epoxy compound (i-3) to the epoxy compound (i-8) was changed to 0.8 g:25.9 g in Example 9, 1.26 g:23.95 g in Example 10, 2.23 g:22.2 g in Example 11, and 3.82 g:21.5 g in Example 12.

Example 13

0.4 g of the epoxy compound (i-3), 25.75 g of the epoxy compound (i-7), and 31.65 g of the curing agent (ii-1) were placed in a four-necked flask, and defoaming was performed at 80° C. for 30 minutes with stirring, followed by adding 0.26 g of the curing accelerator (iii-1) thereto to obtain a thermosetting composition. The obtained thermosetting composition was heated at 100° C. for 2 hours and was then heated at 150° C. for 5 hours to obtain a cured product.

Example 14 to Example 16

Curing was performed in the same manner as in the case of Example 13 by matching an epoxy value with the equivalent of a curing agent except that the proportion of the epoxy compound (i-3) to the epoxy compound (i-7) was changed to 0.83 g:25.8 g in Example 14, 1.3 g:24.05 g in Example 15, and 2.3 g:23.0 g in Example 16.

Example 17

0.3 g of the epoxy compound (i-3), 19.7 g of the epoxy compound (i-5), and 32.7 g of the curing agent (ii-1) were placed in a four-necked flask, and defoaming was performed at 80° C. for 30 minutes with stirring, followed by adding 0.2 g of the curing accelerator (iii-1) thereto to obtain a thermosetting composition. The obtained thermosetting composition was heated at 100° C. for 2 hours and was then heated at 150° C. for 5 hours to obtain a cured product.

Example 18 to Example 20

Curing was performed in the same manner as in the case of Example 17 by matching an epoxy value with the equivalent of a curing agent except that the proportion of the epoxy compound (i-3) to the epoxy compound (i-5) was changed to 0.67 g:21.65 g in Example 18, 1.17 g:22.2 g in Example 19, and 1.98 g:19.8 g in Example 20.

Example 21

22.0 g of the epoxy compound (i-9) and 27.85 g of the curing agent (ii-1) were placed in a four-necked flask, and defoaming was performed at 80° C. for 30 minutes with stirring, followed by adding 0.23 g of the curing accelerator (iii-1) thereto to obtain a thermosetting composition. The obtained thermosetting composition was heated at 100° C. for 2 hours and was then heated at 150° C. for 5 hours to obtain a cured product.

Comparative Example 1

24.25 g of the epoxy compound (i-2) and 30.75 g of the curing agent (ii-1) were placed in a four-necked flask, and defoaming was performed at 80° C. for 30 minutes with stirring, followed by adding 0.25 g of the curing accelerator (iii-1) thereto to obtain a thermosetting composition. The obtained thermosetting composition was heated at 100° C. for 2 hours and was then heated at 150° C. for 5 hours to obtain a cured product.

Comparative Example 2

25.05 g of the epoxy compound (i-4) and 26.5 g of the curing agent (ii-1) were placed in a four-necked flask, and defoaming was performed at 80° C. for 30 minutes with stirring, followed by adding 0.25 g of the curing accelerator (iii-1) thereto to obtain a thermosetting composition. The obtained thermosetting composition was heated at 100° C. for 2 hours and was then heated at 150° C. for 5 hours to obtain a cured product.

Comparative Example 3

30.25 g of the epoxy compound (i-6) and 27.75 g of the curing agent (ii-1) were placed in a four-necked flask, and defoaming was performed at 80° C. for 30 minutes with stirring, followed by adding 0.3 g of the curing accelerator (iii-1) thereto to obtain a thermosetting composition. The obtained thermosetting composition was heated at 100° C. for 2 hours and was then heated at 150° C. for 5 hours to obtain a cured product.

Comparative Example 4

24.6 g of the epoxy compound (i-8) and 31.15 g of the curing agent (ii-1) were placed in a four-necked flask, and defoaming was performed at 80° C. for 30 minutes with stirring, followed by adding 0.25 g of the curing accelerator (iii-1) thereto to obtain a thermosetting composition. The obtained thermosetting composition was heated at 100° C. for 2 hours and was then heated at 150° C. for 5 hours to obtain a cured product.

Comparative Example 5

26.35 g of the epoxy compound (i-7) and 31.85 g of the curing agent (ii-1) were placed in a four-necked flask, and defoaming was performed at 80° C. for 30 minutes with stirring, followed by adding 0.26 g of the curing accelerator (iii-1) thereto to obtain a thermosetting composition. The obtained thermosetting composition was heated at 100° C. for 2 hours and was then heated at 150° C. for 5 hours to obtain a cured product.

Comparative Example 6

20.0 g of the epoxy compound (i-5) and 32.8 g of the curing agent (ii-1) were placed in a four-necked flask, and defoaming was performed at 80° C. for 30 minutes with stirring, followed by adding 0.2 g of the curing accelerator (iii-1) thereto to obtain a thermosetting composition. The obtained thermosetting composition was heated at 100° C. for 2 hours and was then heated at 150° C. for 5 hours to obtain a cured product.

The obtained cured products were subjected to a three-point bending test (for flexural strength and flexural moduli), and transmittance, linear expansion, glass transition temperature, and boiling water absorption were measured.

(Measurement of Bending Properties)

Measurements were performed with a tensile tester according to JIS K-6911.

The height and the width of a specimen were measured, the specimen was held while a load was placed on the center of the specimen using a pressure wedge, and the load upon the breakage of the specimen was measured to calculate flexural strength (σ).

Flexural strength σ: (MPa) {kgf/mm²} is determined by the equation below using P: load (N) {kgf} upon breakage of specimen, L: distance (mm) between fulcrums, W: width (mm) of specimen, and h: height (mm) of specimen.

$$\sigma = (3PL)/(2Wh^2)$$

A flexural modulus (E): (MPa) {kgf/mm²} is determined by the equation below using F/Y: gradient (N/mm) {kgf/mm} of linear part of load-deflection curve.

$$E = [L^3/(4Wh^3)] \times [F/Y]$$

(Measurement of Transmittance)

Transmittance at 400 nm was measured using a spectrophotometer.

(Measurement of Linear Expansion)

Linear expansion was measured according to JIS K-6911. The thickness of a specimen was accurately measured, and the measurements were performed according to TMA (Thermal Mechanical Analysis) under a condition of a load of 0.05 N and a rate of raising temperature of 1° C./minute.

A coefficient of linear expansion α1 is determined by the equation below using ΔL1: amount of change in length of specimen when temperature is raised from 30° C. to 80° C., and L: initial length.

$$\alpha 1 = (\Delta L1)/\text{initial length } (L) \text{ of specimen} \times 50$$

(Measurement of Boiling Water Absorption)

Measurements were performed according to JIS K-6911. A specimen is subjected to drying treatment for 24 hours in a thermostat maintained at 50° C. After the treatment, the specimen is cooled to 20° C. in a desiccator, and the mass is measured. The specimen is placed in boiling distilled water to be boiled for 100 hours, and is then taken out, followed by cooling in running water at 20° C. for 30 minutes and wiping off moisture to immediately measure the mass after water absorption.

Boiling water absorption (%) is determined by the equation below using A: boiling water absorption (%), $W_1$: mass (g) of specimen before boiling, and $W_2$: mass (g) of specimen after boiling.

$$A = [(W_2 - W_1)/W_1] \times 100$$

The measurement results are shown in table 1 to table 4.

TABLE 1

|  | Flexural strength MPa | Flexural modulus MPa | Transmittance % | Coefficient of linear expansion ppm/° C. | Boiling water absorption % |
|---|---|---|---|---|---|
| Example 1 | 172.8 | 3070 | 79.4 | 74.9 | 2.1 |

TABLE 1-continued

| | Flexural strength MPa | Flexural modulus MPa | Transmittance % | Coefficient of linear expansion ppm/° C. | Boiling water absorption % |
|---|---|---|---|---|---|
| Example 2 | 176.5 | 3269 | 74.6 | 73.8 | 2.2 |
| Comparative Example 1 | 169.5 | 3205 | 83.3 | 68.1 | 2.3 |
| Comparative Example 2 | 145.0 | 3325 | 71.2 | 82.1 | 2.0 |

TABLE 2

| | Flexural strength MPa | Flexural modulus MPa | Transmittance % | Coefficient of linear expansion ppm/° C. | Boiling water absorption % |
|---|---|---|---|---|---|
| Example 3 | 152.6 | 3062 | 88.9 | 86.3 | 2.4 |
| Example 4 | 149.7 | 3088 | 86.8 | 87.2 | 2.1 |
| Example 5 | 148.0 | 3148 | 88.8 | 86.1 | 2.5 |
| Example 6 | 150.7 | 3096 | 86.8 | 83.5 | 2.0 |
| Example 7 | 163.1 | 3239 | 83.3 | 87.3 | 2.1 |
| Example 8 | 125.1 | 3351 | 84.6 | 74.1 | 3.4 |
| Example 9 | 121.1 | 3323 | 85.1 | 73.6 | 3.6 |
| Example 10 | 124.3 | 3308 | 85.0 | 73.5 | 3.6 |
| Example 11 | 123.1 | 3340 | 84.5 | 72.7 | 3.6 |
| Example 12 | 130.8 | 3348 | 85.4 | 69.1 | 3.0 |

TABLE 3

| | Flexural strength MPa | Flexural modulus MPa | Transmittance % | Coefficient of linear expansion ppm/° C. | Boiling water absorption % |
|---|---|---|---|---|---|
| Example 13 | 149.1 | 3435 | 89.7 | 73.6 | 2.9 |
| Example 14 | 150.2 | 3403 | 89.7 | 71.0 | 2.8 |
| Example 15 | 161.6 | 3500 | 88.4 | 75.4 | 3.4 |
| Example 16 | 154.0 | 3422 | 88.8 | 74.5 | 2.8 |
| Example 17 | 131.6 | 3820 | 90.3 | 68.3 | 4.9 |
| Example 18 | 150.1 | 3793 | 90.5 | 69.3 | 4.6 |
| Example 19 | 140.7 | 3782 | 87.7 | 63.9 | 4.2 |
| Example 20 | 132.6 | 3813 | 89.8 | 66.0 | 4.3 |
| Example 21 | 186.1 | 3443 | 78.4 | 69.5 | 2.2 |

TABLE 4

| | Flexural strength MPa | Flexural modulus MPa | Transmittance % | Coefficient of linear expansion ppm/° C. | Boiling water absorption % |
|---|---|---|---|---|---|
| Comparative Example 3 | 136.6 | 3065 | 83.4 | 92.9 | 2.4 |
| Comparative Example 4 | 82.7 | 3270 | 85.1 | 79.4 | 3.4 |
| Comparative Example 5 | 103.0 | 3515 | 84.7 | 81.7 | 3.4 |
| Comparative Example 6 | 114.7 | 3730 | 89.3 | 75.0 | 5.0 |

In the present invention, it was found that, as for the epoxy compound of Formula (1), more superior epoxy cured article was obtained when 2 to 15 mol % of the nitrogen atoms in Formula (1) remained as epoxy precursors (allyl groups, for example) (the proportion, in Formula (1), of (glycidyl groups) to terminal (glycidyl groups+allyl groups) was 85 to 98 mol %, and the epoxy purity was 85 to 98 mol %) than when all of the three nitrogen atoms in Formula (1) were bonded with epoxy rings via long chain alkylene groups.

The cured products of Example 1 (with epoxy purity of 98 mol %) and Example 2 (with epoxy purity of 89 mol %) are higher in flexural strength and lower in boiling water absorption of the cured product compared to the cured product of Comparative Example 1 (with epoxy purity of 99 mol %). The coefficients of linear expansion of the cured products of Example 1 and Example 2 are in a certain range, and therefore these cured products can be stably used against thermal changes. Compared in terms of flexural strength, cured products obtained with a certain range of epoxy purity show superiority in strength. This indicates that the physical property of a cured product is affected not only by the crosslinking of the epoxy groups but also by a certain proportion of allyl groups that substitute for the epoxy groups.

From the results in Example 21, it is considered that, in a structure in which 2 to 15 mol % of the nitrogen atoms in Formula (1) was substituted with organic groups (for example, alkyl groups such as a methyl group), the three-dimensional crosslinking was partly loosened, the toughness was enhanced, and the strength was enhanced as compared with a structure in which all of the three nitrogen atoms in Formula (1) were bonded with epoxy rings via long chain alkylene groups.

The cured products of Example 1 (with epoxy purity of 98 mol %) and Example 2 (with epoxy purity of 89 mol %) were higher in flexural strength compared to the cured product of Comparative Example 2 (with epoxy purity of 82 mol %) and, at the epoxy purity value in Comparative Example 2, the flexural strength of the cured product decreased.

When a mixed epoxy compound of the epoxy compound (A) in which the proportion, in Formula (1), of (glycidyl groups) to terminal (glycidyl groups+ally groups) is 85 to 98 mol % (with epoxy purity of 85 to 98 mol %) and the epoxy compound (B) other than that is used, the mass ratio (A)/(A+B) is not smaller than 1% by mass and is preferably 1.5 to 50% by mass. Applying this proportion, flexural strength can be enhanced while retaining the values of transmittance and boiling water absorption of the cured product, compared to using the epoxy (B) alone.

The invention claimed is:
1. A thermosetting composition comprising:
(i) an epoxy compound (A) of Formula (1):

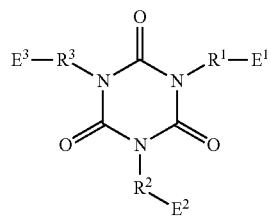

Formula (1)

where $R^1$, $R^2$, and $R^3$ are independently a branched or linear $C_{1-6}$ alkylene group or oxyalkylene group, $E^1$, $E^2$, and $E^3$ are independently an epoxy-containing group of Formula (2):

Formula (2)

an organic group of Formula (3):

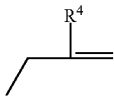

Formula (3)

(where $R^4$ is a hydrogen atom or a methyl group), or a hydrogen atom, and a proportion of the epoxy-containing group of Formula (2) is 85 to 98 mol % to the total number of moles of $E^1$, $E^2$, and $E^3$, and (ii) a curing agent
wherein the curing went is contained in a proportion of 0.5 to 1.5 equivalents to the epoxy group in the epoxy compound (A).

2. The thermosetting composition according to claim 1, wherein $R^1$, $R^2$, and $R^3$ are $C_{1-3}$ alkylene groups, E', $E^2$, and $E^3$ are combinations of the epoxy-containing group of Formula (2) and the organic group of Formula (3) or the hydrogen atom.

3. A thermosetting composition comprising:
the epoxy compound (A) as claimed in claim 1; and
an epoxy compound (B) containing at least two epoxy groups and having a structure different from a structure of the epoxy compound (A), with a mass ratio (A)/[(A)+(B)] of the epoxy compound (A) relative to the total mass of the epoxy compound (A) and the epoxy compound (B) of not smaller than 1% by mass.

4. The thermosetting composition according to claim 3, wherein
the epoxy compound (B) is a compound of Formula (4):

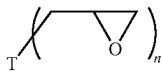

Formula (4)

or Formula (5):

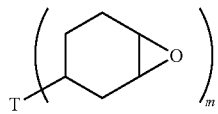

Formula (5)

(where n and m are integers of 2 to 5, T is a divalent to pentavalent organic group, and the organic group is a substituted or unsubstituted alkylene group, oxyalkylene group, arylene group, oxyarylene group, triazinetrione ring, or oxycarbonyl group).

5. The thermosetting composition according to claim 1, wherein the curing agent is an acid anhydride or an amine.

6. The thermosetting composition according to claim 1, wherein a curing aid is contained in a proportion of 0.001 to 0.1 equivalents to the epoxy group.

7. The thermosetting composition according to claim 2, wherein the curing agent is an acid anhydride or an amine.

8. The thermosetting composition according to claim 2, wherein a curing aid is contained in a proportion of 0.001 to 0.1 equivalents to the epoxy group.

9. The thermosetting composition according to claim 3, wherein a curing aid is contained in a proportion of 0.001 to 0.1 equivalents to the epoxy group.

10. The thermosetting composition according to claim 4, wherein a curing aid is contained in a proportion of 0.001 to 0.1 equivalents to the epoxy group.

11. The thermosetting composition according to claim 5, wherein a curing aid is contained in a proportion of 0.001 to 0.1 equivalents to the epoxy group.

* * * * *